United States Patent
Chen et al.

(10) Patent No.: US 12,543,093 B2
(45) Date of Patent: Feb. 3, 2026

(54) METHODS FOR ADAPTING NB-IoT MEASUREMENT PROCEDURE BASED ON CARRIER FREQUENCY RELATIONS

(71) Applicant: Telefonaktiebolaget LM Ericsson (publ), Stockholm (SE)

(72) Inventors: Jie Chen, Beijing (CN); Muhammad Ali Kazmi, Sundbyberg (SE); Santhan Thangarasa, Vällingby (SE); Ritesh Shreevastav, Upplands Väsby (SE); Kazuyoshi Uesaka, Kawasaki (JP); Liping Zhang, Beijing (CN); Emre Yavuz, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 393 days.

(21) Appl. No.: 18/271,699

(22) PCT Filed: Nov. 26, 2021

(86) PCT No.: PCT/CN2021/133494
§ 371 (c)(1),
(2) Date: Jul. 11, 2023

(87) PCT Pub. No.: WO2022/151844
PCT Pub. Date: Jul. 21, 2022

(65) Prior Publication Data
US 2024/0080739 A1    Mar. 7, 2024

(30) Foreign Application Priority Data
Jan. 14, 2021    (WO) .............. PCT/CN2021/071774

(51) Int. Cl.
*H04W 36/30*    (2009.01)
*H04W 36/00*    (2009.01)
*H04W 76/19*    (2018.01)

(52) U.S. Cl.
CPC ..... *H04W 36/305* (2018.08); *H04W 36/0088* (2013.01); *H04W 76/19* (2018.02)

(58) Field of Classification Search
None
See application file for complete search history.

(56) References Cited

U.S. PATENT DOCUMENTS

2017/0257878 A1*    9/2017    Kazmi ............... H04W 72/535
2021/0258841 A1*    8/2021    Cai ................... H04W 36/0094

FOREIGN PATENT DOCUMENTS

| CN | 102461242 A | 5/2012 |
| CN | 102714837 A | 10/2012 |

(Continued)

OTHER PUBLICATIONS

Huawei et al., "R2-2009731: Neighbour cell measurements in RRC_CONNECTED," 3GPP TSG-RAN2 Meeting #112-e, Nov. 2-13, 2020, Electronic Meeting, 5 pages.

(Continued)

*Primary Examiner* — Kouroush Mohebbi
(74) *Attorney, Agent, or Firm* — Withrow & Terranova, PLLC (57) ABSTRACT

Embodiments described herein provide methods and apparatuses for performing one or more measurements of a neighbor cell during radio link monitoring, RLM. A method in a wireless device comprises detecting a radio link problem, RLP, on a serving cell operating in a first carrier frequency; responsive to detecting the RLP, determining a frequency relationship between the first carrier frequency and a second carrier frequency for performing the one or more measurements on the neighbor cell; and determining, based on the frequency relationship, one or more measurement occasions for performing the one or more measurements on the neighbor cell.

17 Claims, 4 Drawing Sheets

(56) References Cited

FOREIGN PATENT DOCUMENTS

CN         103202067 A      7/2013
WO         2019229292 A1    12/2019

OTHER PUBLICATIONS

Qualcomm Incorporated, "R2-2009789: Way forward for connected mode neighbour cell measurement in NB-IoT," 3GPP TSG RAN WG2 #112-e, Nov. 2-13, 2020, Electronic Meeting, 4 pages.
ZTE Corporation et al., "R2-2006834: Cell measurement in connected mode for NB-IoT," 3GPP TSG-RAN WG2 Meeting #111, Aug. 17-28, 2020, Electronic Meeting, 8 pages.
ZTE Corporation et al., "R2-2009058: Further consideration on measurement in connected mode," 3GPP TSG-RAN WG2 Meeting #112, Nov. 2-13, 2020, Electronic Meeting, 12 pages.
Extended European Search Report for European Patent Application No. 21919035.2, mailed Nov. 7, 2024, 13 pages.
Author Unknown, "Technical Specification Group Services and System Aspects; System architecture for the 5G System (5GS); Stage 2 (Release 16)," Technical Specification 23.501, Version 16.7.0, Dec. 2020, 3GPP Organizational Partners, 450 pages.
Lenovo, et al., "R2-2007472: Neighbor cell measurements triggering before RLF," 3GPP TSG-RAN WG2 Meeting Ran2#111, Aug. 17-28, 2020, Electronic Meeting, 2 pages.
International Search Report and Written Opinion for International Patent Application No. PCT/CN2021/133494, mailed Feb. 16, 2022, 12 pages.

\* cited by examiner

FIG. 9

METHODS FOR ADAPTING NB-IoT MEASUREMENT PROCEDURE BASED ON CARRIER FREQUENCY RELATIONS

This application is a 35 U.S.C. § 371 national phase filing of International Application No. PCT/CN2021/133494, filed Nov. 26, 2021, which claims the benefit of International Application No. PCT/CN2021/071774, filed Jan. 14, 2021, the disclosures of which are incorporated herein by reference in their entireties.

TECHNICAL FIELD

Embodiments of the disclosure generally relate to communication, and, more particularly, to methods and apparatuses for performing one or more measurements of a neighbor cell during radio link monitoring, RLM.

BACKGROUND

This section introduces aspects that may facilitate better understanding of the present disclosure. Accordingly, the statements of this section are to be read in this light and are not to be understood as admissions about what is in the prior art or what is not in the prior art.

Figure 1:
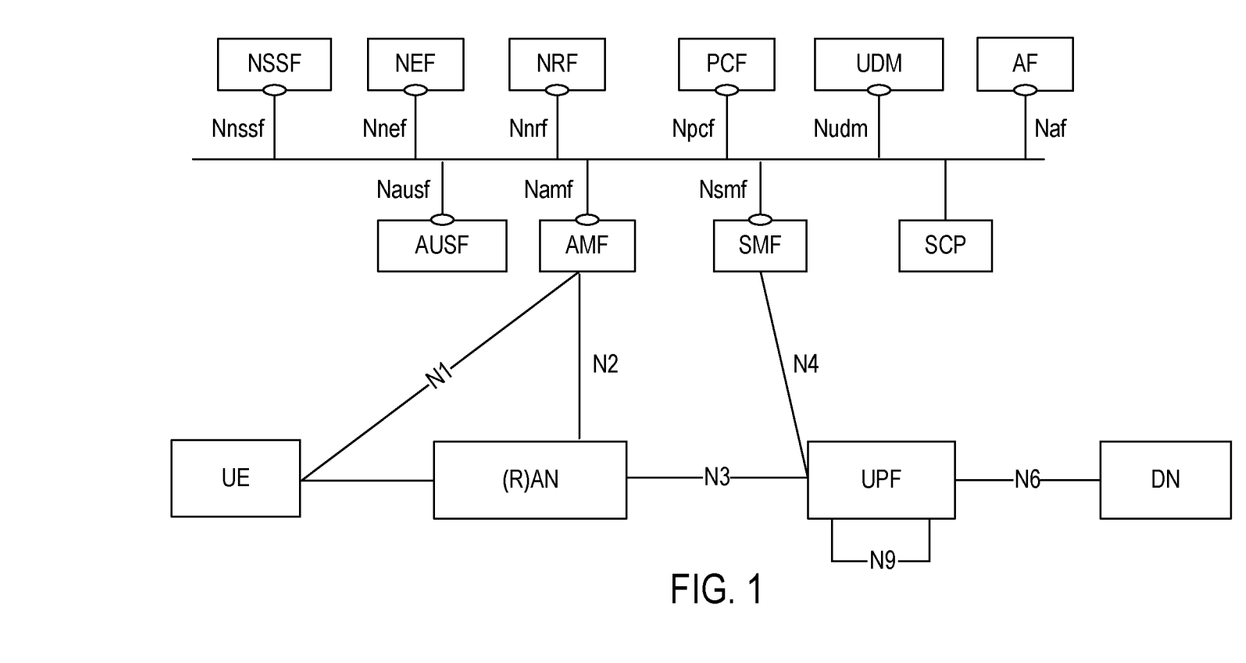
FIG. 1 is a diagram illustrating the architecture for the 5G system.

FIG. 1 illustrates the architecture for the 5th generation (5G) system. As shown, the 5G system comprises a user equipment (UE), a (radio) access network ((R)AN), a user plane function (UPF), a data network (DN), an authentication server function (AUSF), an access and mobility management function (AMF), a session management function (SMF), a service communication proxy (SCP), a network slice selection function (NSSF), a network exposure function (NEF), a network repository function (NRF), a policy control function (PCF), a unified data management (UDM) and an application function (AF).

The 5G architecture is defined as service-based and the interaction between network functions (NFs) is represented in two ways. One way is a service-based representation, where NFs (e.g. AMF) within the control plane enables other authorized NFs to access their services. This representation also includes point-to-point reference points where necessary. The other way is a reference point representation, which shows the interaction existing between the NF services in the NFs described by point-to-point reference point (e.g. N11) between any two NFs (e.g. AMF and SMF).

The NEF supports external exposure of capabilities of NFs. External exposure can be categorized as monitoring capability, provisioning capability, policy/charging capability and analytics reporting capability. The monitoring capability is for monitoring of specific event for UE in the 5G system and making such monitoring events information available for external exposure via the NEF. The provisioning capability is for allowing an external party to provision of information which can be used for the UE in the 5G system. The policy/charging capability is for handling quality of service (QoS) and charging policy for the UE based on the request from an external party. The analytics reporting capability is for allowing an external party to fetch or subscribe/unsubscribe to analytics information generated by the 5G system.

NB-IoT Operation

Narrow Band Internet of Things (NB-IoT) addresses improved indoor coverage, support for massive number of low throughput devices, low delay sensitivity, ultra-low device cost, low device power consumption and (optimized) network architecture. The NB-IoT carrier BW (Bw2) is 200 KHz.

NB-IoT supports 3 different deployment scenarios or mode of operations:

'Stand-alone operation' utilizes for example the spectrum currently being used by GSM/EDGE Radio Access Network (GERAN) systems as a replacement of one or more Global System for Mobile Communications (GSM) carriers. In principle stand-alone operation utilizes any carrier frequency which is neither within the carrier of another system nor within the guard band of another system's operating carrier. The other system can be another NB-IoT operation or any other Radio Access Technology (RAT) e.g. Long Term Evolution (LTE).

'Guard band operation' utilizes the unused resource blocks within an LTE carrier's guard-band. The term guard band may also interchangeably be called guard bandwidth. As an example, in case of LTE Bandwidth (BW) of 20 MHz (i.e., Bw1=20 MHz or 100 RBs), the guard band operation of NB-IoT can place anywhere outside the central 18 MHz but within 20 MHz LTE BW.

'In-band operation' utilizes resource blocks within a normal LTE carrier. The in-band operation may also interchangeably be called in-bandwidth operation. More generally, the operation of one RAT within the BW of another RAT is also called as in-band operation. As an example, in an LTE BW of 50 RBs (i.e., Bw1=10 MHz or 50 RBs), NB-IoT operation over one resource block (RB) within the 50 RBs is called in-band operation.

Anchor Carrier and Non-Anchor Carrier in NB-IoT

In NB-IoT anchor and non-anchor carriers are defined. In anchor carrier the UE assumes that anchor specific signals including Narrowband Primary Synchronization Sequence (NPSS)/Narrowband Secondary Synchronization Sequence (NSSS)/Narrowband Physical Broadcast Channel (NPBCH)/System Information Block—Narrowband (SIB-NB) are transmitted on downlink (DL). In non-anchor carrier the UE does not assume that NPSS/NSSS/NPBCH/SIB-NB are transmitted on downlink. The anchor carrier is transmitted on at least subframes #0, #4, #5 in every frame and subframe #9 in every other frame. Additional DL subframes in a frame can also be configured on an anchor carrier by means of a DL bit map. The anchor carriers transmitting NPBCH/SIB-NB also contain Narrowband Reference Signals (NRS). The non-anchor carrier contains NRS during certain occasions and UE specific signals such as NPDCCH and NPDSCH. NRS, NPDCCH and NPDSCH are also transmitted on anchor carrier. The resources for non-anchor carrier are configured by the network node. The non-anchor carrier can be transmitted in any subframe as indicated by a DL bit map. For example, the eNB signals a DL bit map of DL subframes using Radio Resource Control (RRC) message (DL-Bitmap-NB), which are configured as non-anchor carriers. The anchor carrier and/or non-anchor carrier may typically be operated by the same network node e.g. by the serving cell. But the anchor carrier and/or non-anchor carrier may also be operated by different network nodes.

RLM Procedure in NB-IoT

The purpose of radio link monitoring (RLM) is to monitor the radio link quality of the serving cell of the UE and use that information to decide whether the UE (or wireless device, for example NB-IoT device) is in in-sync or out-of-sync with respect to that serving cell. In Long Term Evolution (LTE), RLM is carried out by a wireless device (or user equipment) performing measurements on downlink reference symbols (e.g. Cell Specific Reference Signal (CRS)) in an RRC_CONNECTED state. If results of radio link monitoring indicate that a number of consecutive out of sync (OOS) indications have occurred, then the wireless device starts a Radio Link Failure (RLF) procedure and declares RLF after the expiry of an RLF timer (e.g. T310). The actual procedure is carried out by comparing the estimated downlink reference symbol measurements to some thresholds, Qout and Qin. Qout and Qin correspond to Block Error Rate (BLER) of hypothetical control channel (e.g. Narrowband Physical Downlink Control Channel (NPDCCH)) transmissions from the serving cell. Examples of the target BLER corresponding to Qout and Qin are 10% and 2% respectively. The radio link quality in RLM is performed based on reference signal (e.g. NRS), at least once every radio frame (when not configured with Discontinuous Reception (DRX)) or periodically with a DRX cycle (when configured with DRX), over the system bandwidth or control channel bandwidth (e.g. NPDCCH BW) for the UE, or over the UE bandwidth (e.g., 200 kHz).

T310 is also called as RLF timer which starts when the UE detects physical layer problems for the PCell. More specifically the RLF timer starts upon UE receiving N310 number of consecutive out-of-sync indications from its lower layers. When T310 expires then the RLF is declared. But T310 is reset upon UE receiving N311 number of consecutive in-sync indications from its lower layers. Upon RLF declaration (i.e., T310 expiration) the UE starts RRC connection re-establishment procedure and starts another timer T311. T311 is reset if the UE successfully performs RRC connection re-establishment to a target NB-IoT cell. If T311 expires before the completion of the RRC connection re-establishment, then the UE goes to RRC_IDLE and it may initiate cell selection. Parameters T310, T311, N310 and N311 are configured by the PCell e.g. via RRC message. T310 can vary between 0 to 8000 ms. T311 can vary from 1000 ms to 30000 ms. N310 can be set from {1, 2, 3, 4, 6, 8, 10, 20}, and N311 can be set from {1, 2, 3, 4, 5, 6, 8, 10}.

DRX Cycle Operation

The UE can be configured with a DRX cycle to use in all RRC states (e.g. RRC idle state, RRC inactive state and RRC connected state) to save UE battery power. Examples of lengths of DRX cycles currently used in RRC idle/inactive state are 256 ms, 320 ms, 640 ms, 1.28 s, 2.56 s, 5.12 s, 10.24 s etc. Examples of lengths of DRX cycles currently used in RRC connected state may range from 256 ms to 10.24 s. It will be appreciated that other DRX cycle configurations are possible. The DRX cycle is configured by the network node and is characterized by the following parameters:

On duration: During the on duration of the DRX cycle, a timer called 'onDurationTime', which is configured by the network node, is running. This timer specifies the number of consecutive control channel subframes (e.g. NPDCCH slots) at the beginning of a DRX Cycle. The on duration may also interchangeably be called the DRX ON period. The on duration is the duration (e.g. in number of downlink subframes) during which the UE, after waking up from DRX, may receive control channel signals (e.g. NPDCCH, wake up signal etc). If the UE successfully decodes the control channel (e.g. NPDCCH) during the on duration, then the UE starts a drx-inactivity timer (see below) and stays awake until its expiry.

drx-inactivity timer: Specifies the number of consecutive control channel (e.g. NPDCCH,) subframe(s) after the subframe in which a control channel (e.g. NPDCCH) indicates an initial UL or DL user data transmission for this MAC entity. Drx-inactivity timer may be configured by the network node.

DRX active time: This time is the duration during which the UE monitors the control channel (e.g. NPDCCH, wake up signals etc). In other words, this is the total duration during which the UE is awake. This includes the "on-duration" of the DRX cycle, the time during which the UE is performing continuous reception while the inactivity timer has not expired and the time the UE is performing continuous reception while waiting for a DL retransmission after one HARQ RTT. This means duration over which the drx-inactivity timer is running is called as DRX active time i.e., no DRX is used by the UE.

DRX inactive time: The time during the DRX cycle other than the active time is called as DRX inactive time i.e., DRX is used by the UE.

Figure 2:
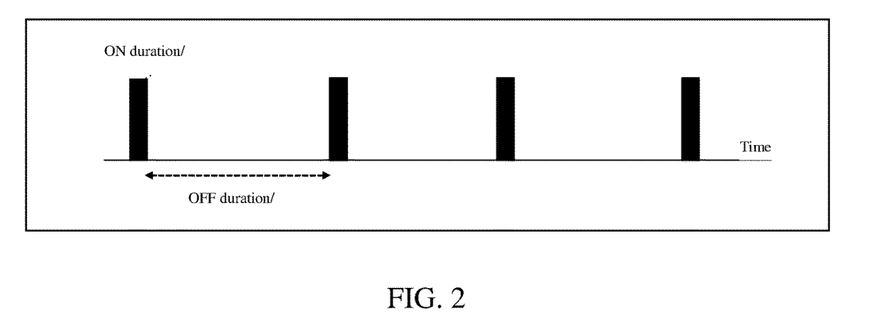
FIG. 2 illustrates a DRX cycle illustrating on and off durations.
Figure 3:
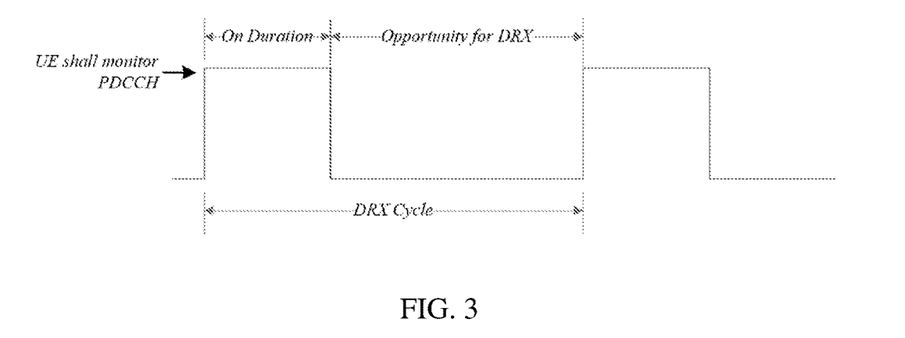
FIG. 3 illustrates DRX cycle operation illustrating different DRX related parameters.

The DRX active time and DRX inactive time are also called as DRX ON and DRX OFF durations of the DRX cycle respectively are shown in FIG. 1. The DRX inactive time may also be called as non-DRX or non-DRX period. The DRX operation with more detailed parameters is illustrated in FIG. 2. FIG. 3 shows that the DRX active and inactive times may vary depending on UE receiver activity e.g. DRX inactivity timer is running upon UE being scheduled. This in turn increases DRX active time and proportionally shortens the DRX inactive time.

FIG. 2 illustrates a DRX cycle illustrating on and off durations.

FIG. 3 illustrates DRX cycle operation illustrating different DRX related parameters.

Figure 4:
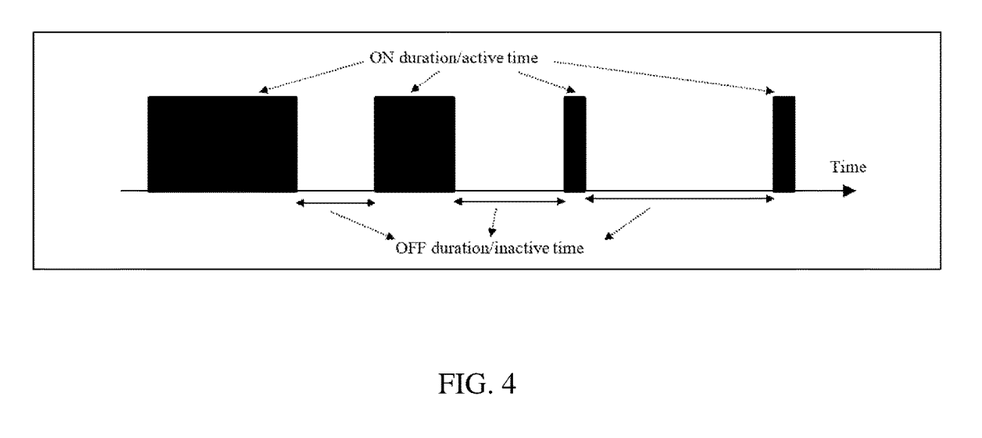
FIG. 4 illustrates a DRX cycle showing variation in on and off durations due to UE receiver activity.

FIG. 4 illustrates a DRX cycle showing variation in on and off durations due to UE receiver activity.

DRX configuration herein may also be an enhanced or extended DRX (eDRX) configuration which applies in RRC_IDLE or RRC_INACTIVE states (only up to 10.24 seconds). In legacy DRX related procedures the UE can be configured with DRX cycle length of up to 10.24 seconds. But UEs supporting extended DRX (eDRX) can be configured with a DRX cycle at least longer than 10.24 seconds and typically much longer than 10.24 seconds i.e. in order of several seconds to several minutes. The eDRX configuration parameters include an eDRX cycle length, paging window length aka paging time window (PTW) length etc. Within a paging time window (PTW) of the eDRX, the UE is further configured with one or more legacy DRX cycles.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

An object of the present invention is to provide a UE that performs reliable measurements of a neighbor cell.

According to some embodiments there is provided a method performed by a wireless device for performing one or more measurements of a neighbor cell during radio link monitoring, RLM. The method comprises detecting a radio link problem, RLP, on a serving cell operating in a first carrier frequency; responsive to detecting the RLP, determining a frequency relationship between the first carrier frequency and a second carrier frequency for performing the one or more measurements on the neighbor cell; and determining, based on the frequency relationship, one or more measurement occasions for performing the one or more measurements on the neighbor cell. The wireless device may comprise a NB-IoT device.

For example, a wireless device, upon detecting a radio link problem (RLP), determines a relationship between a first carrier frequency (F1) of serving cell (cell1) and a second carrier frequency (F2) of at least one neighbor cell (cell2), and determines one or more measurement occasions (MO) for performing one or more measurements on at least cell2. For example, if F1 and F2 are different, then the MOs may comprise one or more inactive time resources of the serving cell. But if F1 and F2 are the same, then the MOs may comprise any time resources. Examples of serving cell inactive time resources are DRX inactive time (e.g. DRX OFF duration), invalid time resources (e.g. subframes between search space etc.). The wireless device may then perform neighbor cell measurements during the determined MOs if they are available, and use the measurements for one or more procedures e.g. for RRC re-establishment etc.

The UE may detect a radio link problem (RLP) based one or more of the following:
- Upon detecting N1 (an integer value) consecutive out of sync (OOS) indications (i.e., OOS indication from the layer 1 processing). The value of N1 may be predefined or may be configured by the serving cell.
- Upon detecting N1 (an integer value) OOS indications over certain time period (T1), where N1 can be consecutive or non-consecutive OOS detection. The value of N1 may be predefined or may be configured by the serving cell.
- Upon starting an RLF timer e.g. T310.
- Upon the RLF timer, which is running, exceeding certain threshold e.g. T2 seconds.
- Upon triggering an early Qout event.
- Upon serving cell quality metric (e.g. NRSRQ, SINR etc.) falling below a predetermined threshold. The threshold may be predefined or may be configured by the serving cell.
- Upon a serving cell quality metric (e.g. NRSRQ, SINR etc.) falling and staying below a predetermined threshold for a certain time period e.g. T3 seconds. The predetermined threshold may be pre-defined or may be configured by the serving cell.
- Upon serving cell quality (e.g. NRSRQ, SINR etc.) falls and stays below a certain threshold for a certain ratio or percentage of time over a time period, e.g. T4 seconds over T5 seconds or X % of T5 seconds.

There are, proposed herein, various embodiments which address one or more of the issues disclosed herein.

Certain embodiments may provide one or more of the following technical advantage(s).
- The UE neighbor cell measurement behavior in RRC connected state is well defined leading to consistent measurement results.
- The UE in RRC connected state can perform neighbor cell measurement without disrupting serving cell operation e.g. ensuring scheduling of signals without interruption.
- The radio resources (e.g. RBs) allocated by the base station (BS) for UE serving cell operation are utilized more efficiently.
- The time to perform RRC connection re-establishment upon RLF is reduced.
- The UE power consumption is reduced since UE can fully or partially complete neighbor cell measurement for RRC connection re-establishment already upon RLF declaration.
- The UE neighbor cell measurement for RRC re-establishment can be done on any type of carrier without measurement gaps e.g. on anchor, non-anchor or inter-frequency carriers etc.
- Ability for the UE to also select cells in different frequency (inter-frequency) based upon measurements upon RLF.

BRIEF DESCRIPTION OF THE DRAWINGS

These and other objects, features and advantages of the disclosure will become apparent from the following detailed description of illustrative embodiments thereof, which are to be read in connection with the accompanying drawings.

DETAILED DESCRIPTION

For the purpose of explanation, details are set forth in the following description in order to provide a thorough understanding of the embodiments disclosed. It is apparent, however, to those skilled in the art that the embodiments may be implemented without these specific details or with an equivalent arrangement.

There currently exist certain challenge(s). In RRC connected state, the NB-IoT UE does not perform any neighbor cell measurements. In order to speed up RRC connection re-establishment upon radio link failure (e.g. expiry of T310 timer), the UE can be configured to perform neighbor cell measurement (e.g. detect a neighbor cell) before the occurrence or triggering of RLF. However, before the RLF is triggered the UE can also be scheduled to receive and/or transmit signals (e.g. receive NPDSCH etc.) by its serving cell. This means that if the UE is scheduled before triggering of RLF, then it should be able to receive and transmit signals in the serving cell. Furthermore, in NB-IoT, measurement gaps are not allowed/supported for any measurement. Also, NB-IoT UE may also be configured on non-anchor carrier e.g. for receiving/transmitting signals, for RLM etc. Due to these reasons, the UE may not be able to perform consistently and reliably perform neighbor cell measurements (e.g. detect a neighbor cell) before the occurrence or triggering of RLF. Due to inconsistent UE measurement behavior, the neighbor cell measurement results cannot be reliably used for any mobility related decisions e.g. for RRC connection re-establishment etc. Furthermore, this may lead to loss of data in the serving cell. This may also result in loss of scheduling grant e.g. wastage of BS radio resources. Therefore, new measurement procedures are needed to ensure that the UE performs reliable measurements of a neighbor cell in RRC connected state that on one hand will enhance RRC connection re-establishment procedure, and on the other hand will prevent any loss of radio resources in the serving cell.

Certain aspects of the present disclosure and their embodiments may provide solutions to these or other challenges.

The present disclosure proposes an improved solution for providing a UE that performs reliable measurements of a neighbor cell. As an exemplary example, the solution may be applied to the communication system shown in FIG. 1. The functional description of the entities shown in FIG. 1 is specified in clause 6 of 3GPP TS 23.501, which is incorporated herein by reference in its entirety.

Note that within the context of this disclosure, the term terminal device (or UE or wireless device) used herein may also be referred to as, for example, access terminal, mobile station, mobile unit, subscriber station, or the like. It may refer to any (a stationary or mobile) end device that can access a wireless communication network and receive services therefrom. By way of example and not limitation, the UE may include a portable computer, an image capture terminal device such as a digital camera, a gaming terminal device, a music storage and playback appliance, a mobile phone, a cellular phone, a smart phone, a tablet, a wearable device, a personal digital assistant (PDA), an integrated or embedded wireless card, an externally plugged in wireless card, or the like.

In an Internet of things (IoT) scenario, a terminal device (or UE) may represent a machine or other device that performs monitoring and/or measurements, and transmits the results of such monitoring and/or measurements to another terminal device (or UE) and/or a network equipment. In this case, the terminal device (or UE) may be a machine-to-machine (M2M) device, which may, in a 3GPP context, be referred to as a machine-type communication (MTC) device. Particular examples of such machines or devices may include sensors, metering devices such as power meters, industrial machineries, bikes, vehicles, or home or personal appliances, e.g. refrigerators, televisions, personal wearables such as watches, and so on.

As used herein, the term "communication system" refers to a system following any suitable communication standards, such as the first generation (1G), 2G, 2.5G, 2.75G, 3G, 4G, 4.5G, 5G communication protocols, and/or any other protocols either currently known or to be developed in the future. Furthermore, the communications between a terminal device and a network node (or network entity) in the communication system may be performed according to any suitable generation communication protocols, including, but not limited to, 1G, 2G, 2.5G, 2.75G, 3G, 4G, 4.5G, 5G communication protocols, and/or any other protocols either currently known or to be developed in the future. In addition, the specific terms used herein do not limit the present disclosure only to the communication system related to the specific terms, which however can be more generally applied to other communication systems.

In some embodiments a general term "network node" is used and it can correspond to any type of radio network node or any network node, which communicates with a UE and/or with another network node. Examples of network nodes are NodeB, MeNB, SeNB, a network node belonging to MCG or SCG, base station (BS), multi-standard radio (MSR) radio node such as MSR BS, eNodeB, gNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME, etc.), O&M, OSS, SON, positioning node (e.g. E-SMLC), MDT, test equipment (physical node or software), etc.

In some embodiments the non-limiting term user equipment (UE) or wireless device is used, and it refers to any type of wireless device communicating with a network node and/or with another UE in a cellular or mobile communication system. Examples of UE are NB-IoT device, target device, device to device (D2D) UE, machine type UE or UE capable of machine to machine (M2M) communication, PDA, PAD, Tablet, mobile terminals, smart phone, laptop embedded equipped (LEE), laptop mounted equipment (LME), USB dongles, ProSe UE, V2V UE, V2X UE, etc.

The embodiments are described for LTE, e.g. MTC and NB-IoT. However, the embodiments are applicable to any RAT or multi-RAT systems, where the UE receives and/or transmit signals (e.g. data), e.g. LTE FDD/TDD, WCDMA/HSPA, GSM/GERAN, Wi Fi, WLAN, CDMA2000, 5G, NR, etc.

The term "time resource" used herein may correspond to any type of physical resource or radio resource expressed in terms of length of time. Examples of time resources are: symbol, mini-slot, time slot, subframe, radio frame, TTI, short TTI, interleaving time, etc.

The term "signal or radio signal" used herein can be any physical signal or physical channel. Examples of DL physical signals are reference signal (RS), such as NPSS, NSSS, NRS, CSI-RS, DMRS, signals in SSB, DRS, CRS, PRS etc. Examples of UL physical signals are reference signal such as SRS, DMRS etc. The term physical channel refers to any channel carrying higher layer information e.g. data, control etc. Examples of physical channels are PBCH, NPBCH, PDCCH, PDSCH, MPDCCH, NPDCCH, NPDSCH, E-PDCCH, PUSCH, PUCCH, NPUSCH etc.

The term "carrier frequency" used herein refer to a frequency of a cell which can be a serving cell or a non-serving cell. In TDD the same carrier frequency is used in UL and DL for the same cell. In FDD or HD-FDD different carrier frequencies are used in UL and DL for the same cell. One or plurality of cells can operate on the same carrier frequency. The carrier frequency may also be called as simply carrier, frequency, frequency channel, radio channel etc. The carrier frequency can be indicated or signaled by the network to the UE or by the UE to network (e.g. with measurement results) by a carrier frequency number or identifier or radio channel number or identifier called as ARFCN or EARFCN etc. There is separate ARFCN or EARFCN for UL and DL in FDD or HD-FDD.

The UE performs measurements on one or more reference signal (RS) transmitted in a cell, which can be serving cell or neighbor cell. The measured cell can operate on or belong to the serving carrier frequency (e.g. an intra-frequency carrier) or it can operate on or belong to the non-serving carrier frequency (e.g. an inter-frequency carrier, inter-RAT carrier etc.). Examples of RS are given above. Examples of measurements are cell identification (e.g. PCI acquisition, cell detection), Reference Symbol Received Power (RSRP), Reference Symbol Received Quality (RSRQ), secondary synchronization RSRP (SS-RSRP), narrowband RSRP (NRSRP), narrowband RSRQ (NRSRQ), SS-RSRQ, SINR, RS-SINR, SS-SINR, CSI-RSRP, CSI-RSRQ, acquisition of system information (SI), cell global ID (CGI) acquisition, Reference Signal Time Difference (RSTD), UE RX-TX time difference measurement, Radio Link Monitoring (RLM), which consists of Out of Synchronization (out of sync) detection and In Synchronization (in-sync) detection etc. CSI measurements performed by the UE are used for scheduling, link adaptation etc. by network. Examples of CSI measurements or CSI reports are CQI, PMI, RI etc. They may be performed on reference signals like CRS, CSI-RS or DMRS.

The term measurement occasion (MO) used herein comprises any time instance or time duration over which the UE can perform one or more measurements on signals of one or more cells. MO can be expressed in terms of a duration, e.g. X1 seconds or milliseconds, X2 number of time resources. The MO can occur periodically or aperiodically. The MO may also be called as measurement opportunity, measurement resources, measurement instances etc.

The term serving cell inactive time resources used herein may also be simply called as inactive time resources or inactive resources. During the inactive time resources the UE is not expected to operate signals in the serving cell. A UE operating a signal in a serving cell may comprise receiving the signal and/or transmitting the signal in the serving cell. More specifically during the inactive time resources the UE is not expected to be scheduled for receiving and/or transmitting signals in the serving cell. On the other hand, during active time resources the UE may be scheduled in the serving cell. Examples of inactive time resources are time resources during the DRX inactive time, invalid time resources (ITR), time resources during UL gaps for DL synchronization etc. The inactive time resources may also be referred to as inactive time period, inactive time duration, inactive time occasion etc.

The term invalid time resource (ITR) used herein may be considered to comprise a length of time or one or plurality of time resources (e.g. slots, subframes etc.) over which the UE is not expected to be scheduled, even the invalid time resources fully or partially overlap in time with DRX active time. Examples of ITR comprise one or more of: unused subframes between UL and DL in HD-FDD when switching between UL and DL, subframes occurring between control channel search spaces (e.g. between NPDCCH reception occasions), or subframes not indicated in 'NB-IoT DL subframe' bitmap configured by the network, etc.

In embodiments described herein, a UE may be served by a first cell (cell1). Cell1 may be managed or served or operated by a network node (NW1), e.g. a base station. The UE may operate in a certain coverage enhancement (CE) level with respect to a certain cell, e.g. cell1. The UE may be configured to receive signals (e.g. paging, WUS, NPDCCH, NPDSCH, PDSCH etc.) from at least cell1. The UE may further be configured to perform one or more measurement on cell1 and one or more additional cells, e.g. neighbor cells.

Figure 5:
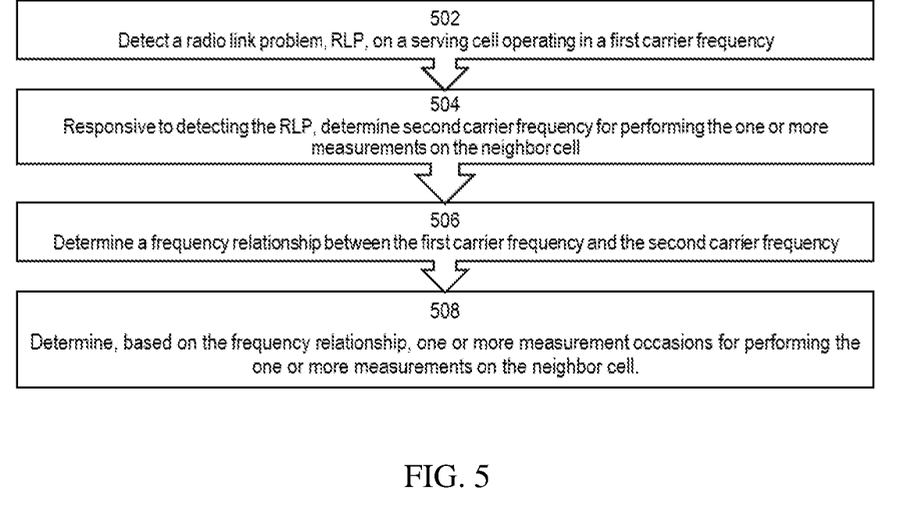
FIG. 5 is a flowchart illustrating a method implemented at wireless according to an embodiment of the disclosure.

FIG. 5 is a flowchart illustrating a method implemented at an NEF entity according to an embodiment of the disclosure.

FIG. 5 depicts a method in accordance with particular embodiments, the method begins at step 502 with detecting a radio link problem, RLP, on a serving cell operating in a first carrier frequency. In step 504 the method comprises responsive to detecting the RLP, determining a second carrier frequency for performing the one or more measurements on the neighbor cell. In step 506 the method comprises determining a frequency relationship between the first carrier frequency and the second carrier frequency. In step 508, the method comprises determining, based on the frequency relationship, one or more measurement occasions for performing the one or more measurements on the neighbor cell. In some examples, the method further comprises using one or more measurements to perform one or more of: performing Radio Resource Control (RRC) connection re-establishment on the neighbor cell, and acquiring system information of the neighbor cell; and informing the neighbor cell that RRC connection re-establishment has been successfully performed. It will be appreciated that in some examples, the ordering of the steps performed by the wireless device may be changed. The terms wireless device and UE may be used interchangeably herein.

In some examples, therefore, a UE is provided wherein the wireless device is served by a serving cell (cell1) operating in a first carrier frequency (F1). Cell1 is managed or operated by a first network node (NW1 e.g. BS, eNB). The first carrier frequency, F1, may be an anchor carrier or may be a non-anchor carrier.

The UE is further configured to perform RLM on signals of cell1 e.g. on NRS. Therefore, the UE regularly evaluates radio link quality on reference signals (e.g. NRS) of cell1 to detect in-sync (IS) or out of sync (OOS). The UE performs RLM on cell1 regardless of whether F1 is an anchor carrier or a non-anchor carrier. Upon the occurrence of detection of radio link failure on F1 of cell1 the UE may initiate RRC connection re-establishment procedure to a neighbor cell (target cell) (cell2). Cell2 may belong to F1 (i.e. the carrier of serving cell) or may belong to a different carrier frequency, a second carrier frequency (F2), which is different than F1. Therefore, carrier frequency of cell2 (F1 or F2 or any other carrier) may be an anchor carrier or non-anchor carrier. The one or more carrier frequencies on which the UE is required to perform RRC re-establishment may be configured by the network node. The UE may or may not be configured in DRX.

The radio link problem (RLP) on cell1 may correspond to the state in which the UE may not be able to maintain acceptable radio link quality of cell1. For example, the UE does not or may not be able to successively receive or decode control channel (e.g. NPDCCH) signals received from cell1 because of low Signal to Noise ratio (SNR) or Signal to Interference and Noise radio (SINR) condition. The UE can detect a RLP in cell1 based on one or more criteria, which can be pre-defined or configured by the network node. The parameters (e.g. thresholds and time limits) associated with the one or more criteria may also be pre-defined or configured by the network node, e.g. the base station of the serving cell.

As an example, step 502 may comprise detecting the RLP on the serving cell based on one or more of the following criteria:

- detecting a predetermined number (N1) of consecutive OOS indications, e.g. N1=4;
- detecting a predetermined number (N1) OOS indications in a certain time period (T1), where N1 can be consecutive or non-consecutive OOS indications, e.g. T1=1 second;
- starting an RLF timer (e.g. T310), e.g. T310 may start upon detecting N consecutive OOS indication from the layer 1 processing;
- detecting the RLF timer, which is running, exceeding predetermined threshold time e.g. T2 seconds;

triggering an early Qout event (e.g. event E1). The early Qout event (event E1) may be triggered when the signal quality is slightly higher than that corresponding to out-of-sync triggering threshold. This means the early Qout event (e.g. event E1) is triggered before the actual OOS detection. This enables the UE to take an appropriate action e.g. adapts its receiver etc.

detecting a serving cell quality (e.g. NRSRQ, SINR etc.) falling below a predetermined threshold value;

detecting a serving cell quality (e.g. NRSRQ, SINR etc.) falling and staying below a predetermined threshold value for a predetermined time, e.g. T3 seconds;

detecting a serving cell quality (e.g. NRSRQ, SINR etc.) falling and staying below a predetermined threshold value for a certain ratio or percentage of time over a time period, e.g. T4 seconds over T5 seconds or X % of T5 seconds;

detecting a predetermined drop in a serving cell quality (e.g. NRSRQ, SINR etc.) compared to a strongest serving cell quality value (e.g. NRSRQ, SINR etc.), which may occur after UE's connection to cell1;

detecting a predetermined drop in serving cell quality (e.g. NRSRQ, SINR etc.) compared to a strongest serving cell quality (e.g. NRSRQ, SINR etc.), which may occur after UE's connection to cell1, staying below this drop over a certain time period, e.g. T6 seconds;

detecting that the UE is not able to successfully receive the control channel (e.g. NPDCCH) from the serving cell.

Determining Carrier(s) for Performing Neighbor Cell Measurement(s)

The detection of RLP triggers the UE to determine information about at least one carrier frequency (F2) for performing one or more measurements (e.g. NRSRP, NRSRQ etc.) on one or more cells of that carrier. The carrier frequency information may comprise for example E-UTRA ARFCN (EARFCN) of the carrier, an indication whether the carrier is anchor or non-anchor carrier, a priority of the carrier with which the UE will do measurement, a type of measurement (e.g. NRSRP) to be performed on cells of that carrier etc.

Step 504 may comprise the UE determining the carrier, F2, based on measurement configuration received from the network node e.g. cell1. In one example the information can be received via RRC message in advanced and stored in the UE. The UE can then retrieve the carrier frequency information from its memory. In another example, upon detecting RLP, the UE requests the network node to provide the UE with the measurement configuration for doing measurements e.g. for RRC re-establishment. The UE may receive the requested measurement configuration containing information about at least one carrier frequency. In yet another example, the UE may use historical data or past statistics related to measurements performed by the UE and use those results for determining at least one carrier frequency for measurements. In yet another example, the UE may determine F2 autonomously based on e.g. blind search that involves UE scanning neighboring frequencies or frequency location and looks for synchronization signals.

Determining a Frequency Relationship Between F1 and F2

Step 506 may comprise the UE determining a frequency relationship between frequencies of the serving carrier frequency (F1) (i.e. carrier of cell1) and at least one carrier frequency (F2) of at least one cell (cell2) on which the UE is expected to perform measurement upon triggering of the RLP in cell1. It will be appreciated that the UE may determine a frequency relationship between F1 and any number (n) of carrier frequencies (e.g. F2, F3, . . . Fn), e.g. relation between F1 and F2, between F1 and F3 and so on. For simplicity, the idea of frequency relationship is explained for two carriers e.g. between F1 and F2. However, the determination of a frequency relationship may be applied to any pair of carriers.

Step 506 may comprise determining whether the first carrier frequency is the same or different from the second carrier frequency. For example, step 506 may comprise determining whether F1 and F2 are the same e.g. have the same EARFCN, or whether F1 and F2 are different e.g. have different EARFCNs.

In some examples step 506 may comprise determining whether the second carrier frequency is an intra-frequency carrier or an inter-frequency carrier. For example, the second carrier may be determined as an intra-frequency carrier upon determining that the first carrier frequency and the second carrier frequency are the same, or the second carrier may be determined as an inter-frequency carrier upon determining that the first carrier frequency and the second carrier frequency are different.

Step 506 may also comprise determining whether F1 is an anchor carrier or a non-anchor carrier.

F2 may be assumed to be an anchor carrier since cell change (e.g. RRC re-establishment) is performed on the anchor carrier. After the cell change to the target cell (e.g. cell2), the UE may need to acquire its system information etc.

Step 506 may comprise the UE determining the frequency relationship between F1 and F2, for example, by comparing the EARFCNs of F1 and F2. The UE may further determine whether F1 is an anchor or non-anchor carrier for example based on received information e.g. in measurement configuration, which contains an indication whether the carrier is an anchor or non-anchor. The UE may further determine whether F1 is an anchor or non-anchor carrier for example based on historical information e.g. whether UE has detected anchor carrier specific signals (e.g. NPSS/NSSS, NPBCH etc.) or system information (e.g. MIB-NB, SIB1-NB, etc.) on certain carrier or not, in the past.

Determining One or More Measurement Occasions (MO) for Performing Measurements on F2

As previously described, step 508 comprises the UE determining one or more measurement occasions (MO) for performing measurements on at least one cell (e.g. cell2) operating on at least one carrier, F2. The measurement occasions for cell2 measurement depends on the frequency relationship between F1 and F2 determined by the UE in the step 506.

The key aspects or properties of Mos comprise enabling the UE to perform measurements on at least cell2 under one or more serving cell operational constrains. The serving cell operational constrains may ensure that the UE does not miss critical DL and/or UL data (e.g. scheduling, paging) in the serving cell while measuring on cell2. Examples of such constrains comprise:

UE is not configured to perform measurement in measurement gaps, i.e. no measurement gap pattern is configured. This means MOs are not measurement gaps.

UE, while performing a measurement on cell2 (i.e. during the MOs), may not interrupt or miss reception of more than Y1% of signals from cell1. As special case Y1=0 so no interruption of signals received from cell1 are allowed during measurement on cell2. In some examples, Y1=G1/Gt*100; where G1 is the total number of signals (e.g. time resources) not received by UE during measurement time and Gt is the total number of signals (e.g. time resources) transmitted by cell1 during measurement time. Y1 may also be referred to as interruption probability of DL signals received by the UE.

UE while performing measurement on cell2 (i.e. during the MOs) may not interrupt or miss transmission of more than Y2% of signals to cell1. As special case Y2=0 so no interruption of signals transmitted to the serving cell are allowed during measurement on cell2. In some examples, Y2=P1/Pt*100; where P1 is the total number of signals (e.g. time resources) not transmitted by UE during measurement time and Pt is the total number of signals (e.g. time resources) which were expected to be transmitted by UE in cell1 during measurement time. Y2 may also be referred to as an interruption probability of UL signals transmitted by the UE.

To meet one or more serving cell operational constrains, the MOs are determined based on one or more of the following rules in the following measurement scenarios:

Scenario 1

Figure 6:
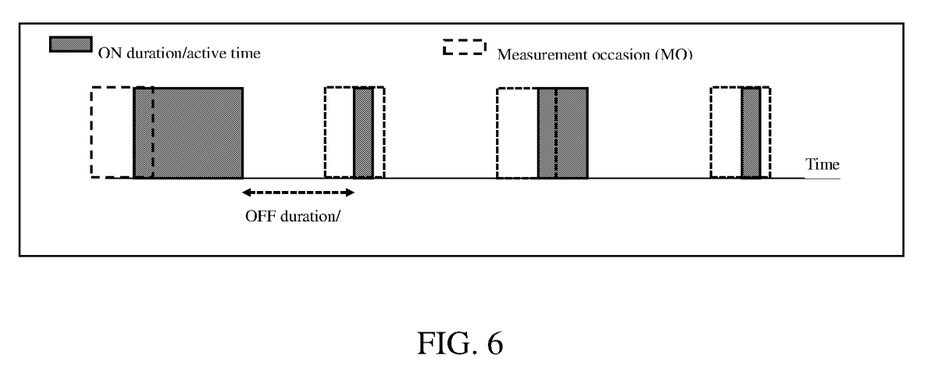
FIG. 6 is an example of periodic measurement occasions when serving cell (cell1)' carrier (F1) and carrier (F2) of target cell (cell2) are the same, UE is configured with DRX.

In this example, the first carrier frequency and the second carrier frequency are the same, and the one or more measurement occasions comprise any time resource. In this scenario, F1 and F2 are the same (intra-frequency carrier) and F1 is also an anchor carrier, then the UE may perform any type of measurement on cell2 (e.g. cell detection, NRSRP etc.) in any time resource. As stated earlier, F2 may be assumed to be an anchor carrier. This is because the cell detection can be done only on the anchor carrier e.g. on NPSS/NSSS, which are transmitted only on the anchor carrier. In this scenario the UE does not need to retune its receiver to perform measurement on cell2 or measurement on any cell on F2. In this case MOs comprises any time resource (e.g. subframe) of the serving cell regardless of whether the UE is scheduled or is expected to be scheduled in those time resources in cell1. Therefore, the UE may perform measurement on cell2 while also operating signals in cell1 in parallel e.g. over partially or fully overlapping time, because UE can keep the same downlink carrier frequency. An example of MOs when UE is configured with DRX is illustrated in FIG. 6. As shown here the MOs can even overlap with DRX active time. MOs are typically periodic since UE needs to average multiple samples (e.g. 4-8) over the measurement period.

FIG. 6 is an example of periodic measurement occasions when serving cell (cell1)' carrier (F1) and carrier (F2) of target cell (cell2) are the same. UE is configured with DRX.

Scenario 2

Figure 7:
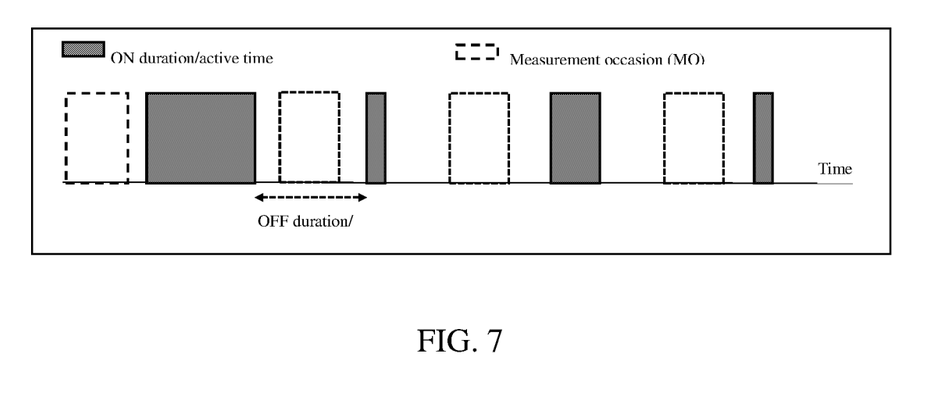
FIG. 7 illustrates an example of periodic measurement occasions when serving cell (cell1)' carrier (F1) and carrier (F2) of target cell (cell2) are different, UE is configured with DRX.

In this example, the first carrier frequency and the second carrier frequency are different, and the one or more measurement occasions comprise inactive time resources of the serving cell. In this scenario the UE needs to retune its carrier frequency in the receiver to perform measurement on cell2 (or one or more cells) on F2 which is different from F1. Therefore, to meet requirements on serving cell operational constrains, in this scenario (#2), the MOs comprise one or more serving cell inactive time resources. During the inactive time resources the UE does not receive or transmit signals or is not expected to receive or transmit signals in cell1. The inactive time resource may also be referred to as an inactive time period, inactive time duration, inactive time occasion etc. The UE may determine MOs comprising inactive time resources based on one or more of the following example rules:

In one example, the one or more measurement occasions comprise time resources during DRX inactive time periods. The UE may determine whether it is configured with DRX or not. If the UE is configured with DRX, then the UE may further determine the DRX inactive time e.g. DRX OFF periods, which the UE may allocate as measurement occasions for measurements on cell2 or one or more cells of F2. Therefore, DRX inactive time periods can be used as MOs for doing the measurements on cells of F2. An example of MOs when UE is configured with DRX and F1 and F2 are different is illustrated in FIG. 7. As shown here, the MOs may only be during DRX inactive times since the UE will have to retune its carrier frequency in the receiver from F1 to F2 for doing measurements on cells of F2. MOs are also typically periodic since UE may need to average multiple samples (e.g. 4-8) over the measurement period.

FIG. 7 illustrates an example of periodic measurement occasions when serving cell (cell1)' carrier (F1) and carrier (F2) of target cell (cell2) are different. UE is configured with DRX.

In some examples, the measurement occasions comprise time resources during DRX inactive time periods provided that the DRX cycle is longer than a predetermined threshold.

In another example, the one or more measurement occasions comprise unused time resources during which the wireless device switches between uplink and downlink time resources of the serving cell during HD-FDD operation. The UE may first determine whether it is configured with HD-FDD operation. If the UE is configured with HD-FDD operation, then the UE may determine unused time resources during which the UE switches between UL and DL time resources of the serving cell. The unused time resources can be based on a configured pattern of UL and DL time resource (e.g. subframes) in a frame or multiple of frames in HD-FDD operation, or they can be based on a scheduling command triggering the switching between UL and DL subframes. The pattern of UL and DL time resources may be pre-defined or configured by the network node. The UE is not scheduled during the unused time resources. Therefore, the UE can use these unused time resources as MOs for performing measurements on cells of F2.

In another example, the one or more measurement occasions comprise time resources occurring between control channel search spaces. The UE may determine the time resources occurring between control channel search spaces. During these time resources the UE does not monitor the control channel (e.g. between NPDCCH reception occasions). The control channel search spaces are configured by higher layers e.g. via RRC. For example, the network can configure the control channel search space with the NPDCCH start subframe parameter, G, and maximum NPDCCH repetition level, Rmax, UE start to monitor NPDCCH every G×Rmax subframes. For example, if the network configures G=1.5 and Rmax=16, then UE starts to monitor NPDCCH every 24 (=1.5×16) subframes. Therefore, the UE can determine such time resources based on control channel monitoring configuration information. Consider a UE that starts to monitor NPDCCH from subframe #0 according to the search space configuration. Because of the Rmax=16, the network may schedule NPDCCH from subframe #0 to subframe #15, however the network does not schedule NPDCCH from subframe #16 to the next NPDCCH search space start subframe (i.e., subframe #24). The UE may therefore consider subframes #16 to #23 duration as inactive time resources, and they may be used as Mos.

In another example, the one or more measurement occasions comprise time resources during uplink transmission gaps for downlink synchronization. The UE may determine if it is creating or expected to create uplink transmission gaps for DL synchronization. During these uplink transmission gaps the UE does not transmit anything in the UL. Instead the UE switches/retunes to downlink carrier in order to acquire or refine time and/or frequency synchronization of DL signals e.g. NPSS, NSSS, NRS etc. This may also be referred to as time and frequency tracking of DL signals. The method may be used especially when the UE is configured with large number of consecutively or frequently occurring UL time resources i.e., with larger number of repetitions such as up to 2048 time resources. For example, the same UL message may be repeated, e.g. transmitted 2048 times, and this UE may be expected to be in uplink mode in at least 2048 consecutive time resources e.g. 2048 consecutive subframes etc. The rules for creating UL gaps are well defined in the standard and configurable. The occurrence of UL gap depends on type of UL signals e.g. NPRACH, NPUSCH etc. Each UL gap is around 40 ms (40*30720 Ts where 1 Ts=32.55 ns) every 256 ms UL transmissions. Therefore, cell1 may be aware of when the UE is using UL gaps for time and/or frequency synchronization of DL signals. Each UL gap for DL synchronization is of certain minimum duration. However, the UE may acquire the DL synchronization well within the UL gap as the gap may be larger than required. Therefore, the UE can utilize the remaining part of the UL gaps (not used or needed for time/frequency sync in DL) for performing measurements on cells of F2. Therefore, the unused part of the UL gap for DL synchronization, can be used as one or more MOs.

In another example, the one or more measurement occasions comprise subframes indicated as unavailable in a downlink bitmap configuration for use with the serving cell. For example, UE may utilize information about the DL bit map configuration received by the UE for operating on cell1 for determining the MOs. The DL bit map configuration indicates DL subframes used in the serving cell e.g. bit 0 may indicate that a certain DL subframe is unavailable and bit 1 may indicate that a certain DL subframe is available on a carrier. The carrier may be an anchor carrier or a non-anchor carrier. These unavailable subframes may however be used for UL transmission e.g. when UE is scheduled in UL or another radio access system such as LTE or NR. For example, subframes not configured in the serving cell (i.e., unavailable DL subframes) may be used by the UE for performing measurements on the neighbor cell provided that the UE is not scheduled on those subframes.

In another example, the one or more measurement occasions comprise time resources during a downlink gap. The DL gap is used to mitigate the downlink resource blocking for long time by the UE in poor coverage which needs large downlink repetitions. Downlink allocations (e.g., NPDCCH, NPDSCH) with less repetitions can be scheduled in the DL gap if the resource can be allocated into the gap. For the UE with DL gap (UE USS Rmax>=dl-GapThreshold for corresponding carrier) nothing will be scheduled in the DL gap, so the DL gap may be utilized for MOs.

The duration and time instance of MOs may further depend on whether F1 is an anchor or non-anchor carrier. Therefore, there are further two sub-scenarios:

Scenario 2.1 comprising F1 being an anchor carrier;
Scenario 2.2: comprising F1 being a non-anchor carrier.

In scenario 2.1, certain subframes (e.g. #0, #4, #5 in every frame and #9 in every other frame) contain anchor specific signals (e.g. NPSS/NSSS/NPBCH/SIB-NB) that are used by the UE for various purposes. Therefore, the UE needs to avoid any measurement occasion which overlaps with any of these signals during DRX active time.

In scenario 2.2, the subframes do not contain any anchor specific signals. Therefore, the UE has more flexibility in creating measurement occasions when cell1 is on non-anchor carrier.

Performing measurement on F2 during the MOs and using the measurement for one or more tasks.

Upon determining the measurement occasions (MOs), as in step 508, the method may further comprise the UE performing one or more measurements on one or more cells of F2 upon detecting the RLP on cell1. It is assumed that the UE is configured with at least one carrier, F2, for doing the measurements. However, the UE may be configured with more than one carrier (e.g. F2, F3), or more generally with n−1 number of carriers (e.g. F2, F3, Fn) for doing the measurements upon detecting RLP. In the case of multiple carriers, the UE may assign more MOs for doing measurements on different carriers according to a rule, which can be pre-defined or configured by the network node or up to UE implementation. For example, the UE may periodically measure on cells of different carriers.

The measurement herein may typically comprise detecting a target cell (e.g. cell2) on F2 using synchronization signals (e.g. NPSS/NSSS) transmitted by the target cell. This requires the UE to typically performs correlation over NPSS/NSSS with pre-defined sets of NPSS/NSSS periodically (e.g. once every 20 or 40 ms), depending on the signal quality (e.g. SINR) of the target cell. For example, the UE may detect the cell within 2-4 attempts (e.g. each attempt every 20-40 ms) if SINR is above threshold e.g. −3 dB or higher. Otherwise UE may detect the cell within larger number of attempts (e.g. 4-20) if SINR is below threshold e.g. below −3 dB. The UE may further perform the signal power measurements (e.g. NRSRP) using NRS on the target cell (cell2) after it has been detected. The signal measurement is used for deciding to select between cells for cell change in case UE has detecting more than one cell. For example, the UE may select a cell whose NRSRP is the largest among all the cells. The UE may further select a cell whose NRSRP is the largest among all the cells but whose NRSRP is also above a certain threshold.

The UE, after selecting the detected cell, may use the selected cell for performing one or more tasks. For example, the UE may perform RRC connection re-establishment on the selected cell. The UE may also acquire the system information of the selected cell. The UE may also inform the base station (e.g. on the selected cell) that it has successfully performed the RRC connection re-establishment e.g. by sending a higher layer message.

If one cell is detected during T310 running time, to reduce the time taken to RRC reestablishment to this detected cell, then RLF timer T310 can be terminated earlier, RLF can be declared directly, and RRC reestablishment can be started earlier.

If one cell is detected during T310 running time, and some pre-defined conditions are satisfied, then RLF timer T310 can be terminated earlier, RLF can be declared directly, and RRC reestablishment can be started earlier. For example, the pre-defined conditions can be defined by a new short timer T1, which is started after one cell is detected and when T1 expires, then T310 can be stopped.

Examples of several rules are provided below, based on embodiments described above, which can be specified in the standard:

General Examples of Rules

1. In one example of a rule, if a carrier frequency (F1) of a serving cell (cell1) and a carrier frequency (F2) of a target cell (cell2) configured for cell change are the same and are also the anchor carriers, then upon detecting a radio link problem (RLP) in cell1, the UE will initiate and perform a measurement (Mx) on cell2 regardless of whether any inactive time resource is available in cell1 during the measurement period of Mx. In this case the measurement time of Mx is expressed as Tx.

2. In another example of a rule, if F1 of cell1 and F2 of cell2 configured for cell change are different, then upon detecting RLP in cell1 the UE will initiate and perform a measurement (My) on cell2 provided that the number of inactive time resources available in cell1 is sufficient to perform My during the measurement period of My. In this case the measurement time of My is expressed as Ty.

3. In another example of a rule, if F1 of cell1 and F2 of cell2 configured for cell change are different, then upon detecting RLP in cell1 the UE will initiate and perform a measurement (My) on cell2 provided that the interruption probabilities of DL signals and UL signals in cell1 during the My measurement period do not exceed Y1% and Y2%. As special case: Y1=0 and Y2=0.

4. In examples 1 and 3:
Examples of RLP comprise one or more of: starting RLF timer (e.g. T310), RLF timer running for more than certain time, detecting certain number of OOS, detecting certain number of OOS over certain time, detecting early OOS etc.
Examples of measurement comprise one or more of: detecting a target cell, signal measurement (e.g. NRSRP, NRSRQ etc.) etc.
Examples of cell change comprise one or more of: RRC connection re-establishment, cell selection, cell reselection etc.
Examples of inactive time resources comprise one or more of: DRX inactive time, invalid time resources (ITR), UL gaps for DL synchronization, unused time resource between UL and DL switching etc.

Specific Examples of Rules

1. In one example of a rule, if F1 of cell1 and F2 of cell2 configured for cell change are the same and are also the anchor carriers, then upon detecting RLP in cell1, the UE will initiate and perform Mx on cell2 over Tx regardless of whether the DRX cycle is used or configured in cell1 during Tx.

2. In another example of a rule, if F1 of cell1 and F2 of cell2 configured for cell change are the same and are also the anchor carriers, then upon detecting RLP in cell1, the UE will initiate and perform Mx on cell2 over Tx regardless of whether any DRX inactive time resource is available in cell1 during Tx.

3. In another example of a rule, if the UE is configured to perform RRC re-establishment to a target cell on an intra-frequency carrier, then upon detecting RLP in cell1, the UE will initiate and perform Mx on cell2 regardless of whether the DRX cycle is used or configured in cell1 during Tx.

4. In another example of a rule, if the UE is configured to perform RRC re-establishment to a target cell on an intra-frequency carrier, then upon detecting RLP in cell1, the UE will initiate and perform Mx on cell2 regardless of whether any DRX inactive time resource is available in cell1 during Tx.

5. In another example of a rule, if F1 of cell1 and F2 of cell2 are different, then upon detecting RLP in cell1, the UE will initiate and perform My on cell2 over Ty provided that the DRX cycle is used or configured in cell1 during Ty.

6. In another example of a rule, if F1 of cell1 and F2 of cell2 are different, then upon detecting RLP in cell1, the UE will initiate and perform My on cell2 over Ty provided that the DRX cycle is used or configured in cell1 during Ty is larger than certain threshold (e.g. 640 ms or longer).

7. In another example of a rule, if F1 of cell1 and F2 of cell2 are different, then upon detecting RLP in cell1, the UE will initiate and perform My on cell2 over Ty provided that at least L1 number of inactive time resources are available at least once every Ts period in cell1 during Ty. Examples of L1=5 ms, Ts=80 ms and Ty=1400 ms (normal coverage) and Ty=14800 (enhanced coverage).

8. In another example of a rule, if the UE is configured to perform RRC re-establishment to a target cell on an inter-frequency carrier, then upon detecting RLP in cell1, the UE will initiate and perform My on cell2 provided that the DRX cycle is used or configured in cell1 during Ty.

9. In another example of a rule, if the UE is configured to perform RRC re-establishment to a target cell on an inter-frequency carrier, then upon detecting RLP in cell1, the UE will initiate and perform My on cell2 provided that the DRX cycle is used or configured in cell1 during Ty is larger than certain threshold (e.g. 640 ms or longer).

10. In another example of a rule, if the UE is configured to perform RRC re-establishment to a target cell on an inter-frequency carrier, then upon detecting RLP in cell1, the UE will initiate and perform My on cell2 provided that that at least L1 number of inactive time resources are available at least once every Ts period in cell1 during Ty.

11. In another example of a rule, if F1 of cell1 and F2 of cell2 are different, then upon detecting RLP in cell1, the UE will initiate and perform My on cell2 provided that the UE will not interrupt reception of any downlink signal and will not interrupt transmission of any uplink signal in cell1 during measurement time, Ty, of My.

12. In another example of a rule, if the UE is configured to perform RRC re-establishment to a target cell on an inter-frequency carrier, then upon detecting RLP in cell1, the UE will initiate and perform My on cell2 provided that the UE will not interrupt reception of any downlink signal and will not interrupt transmission of any uplink signal in cell1 during measurement time, Ty, of My.

Figure 8:
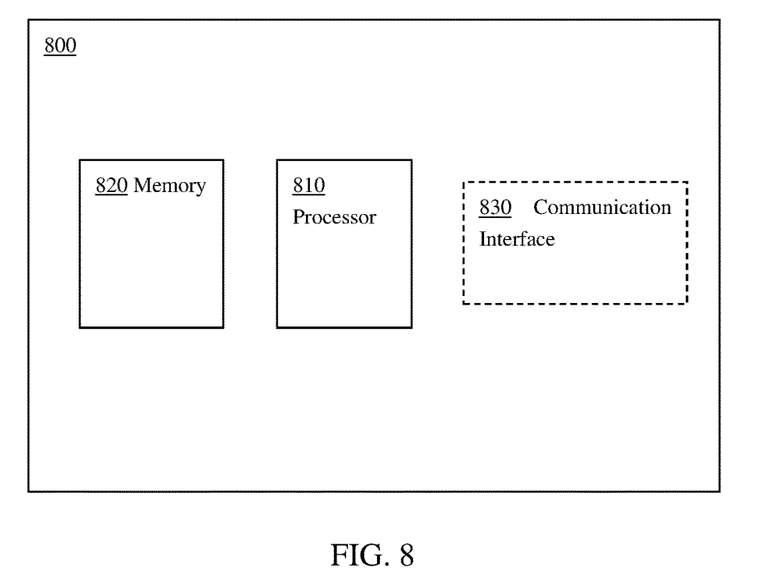
FIG. 8 is a block diagram showing an apparatus suitable for use in practicing some embodiments of the disclosure.

FIG. 8 is a block diagram showing an apparatus suitable for use in practicing some embodiments of the disclosure. For example, the wireless device described above may be implemented through the apparatus 800. As shown, the apparatus 800 may include a processor 810, a memory 820 that stores a program, and optionally a communication interface 830 for communicating data with other external devices through wired and/or wireless communication.

The program includes program instructions that, when executed by the processor 810, enable the apparatus 800 to operate in accordance with the embodiments of the present disclosure, as discussed above. That is, the embodiments of the present disclosure may be implemented at least in part by computer software executable by the processor 810, or by hardware, or by a combination of software and hardware.

The memory 820 may be of any type suitable to the local technical environment and may be implemented using any suitable data storage technology, such as semiconductor based memory devices, flash memories, magnetic memory devices and systems, optical memory devices and systems, fixed memories and removable memories. The processor 810 may be of any type suitable to the local technical environment, and may include one or more of general purpose computers, special purpose computers, microprocessors, digital signal processors (DSPs) and processors based on multi-core processor architectures, as non-limiting examples.

Figure 9:
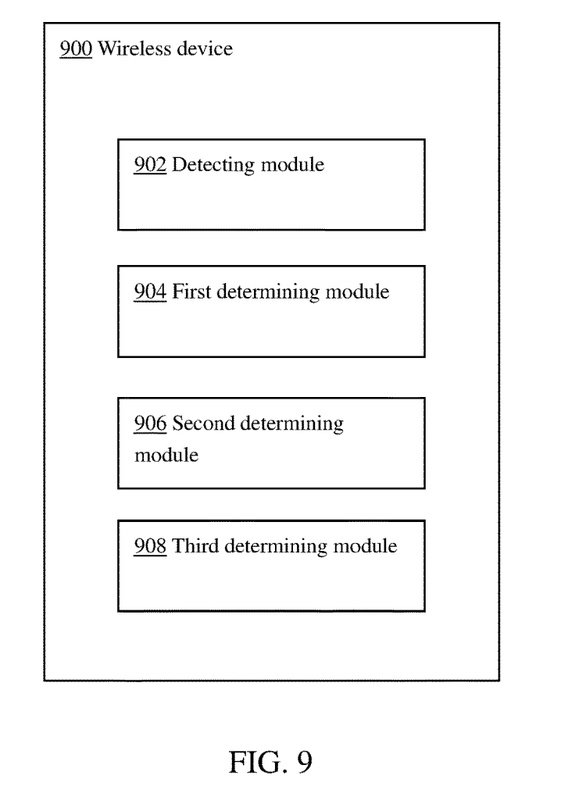
FIG. 9 is a block diagram showing a wireless device according to an embodiment of the disclosure.

FIG. 9 is a block diagram showing a wireless device 900 according to an embodiment of the disclosure. As shown, the wireless device 900 comprises a detecting module 902, a first determining module 904, a second determining model 906, a third determining module 908, a third determining module 910. The detecting module 902 may be configured to detect a radio link problem, RLP, on a serving cell operating in a first carrier frequency. The first determining module 904 may be configured to responsive to detecting the RLP, determine a second carrier frequency for performing the one or more measurements on the neighbor cell. The second determining module 906 may be configured to determine a frequency relationship between the first carrier frequency and the second carrier frequency. The third determining module 908 may be configured to determine, based on the frequency relationship, one or more measurement occasions for performing the one or more measurements on the neighbor cell.

The modules described above may be implemented by hardware, or software, or a combination of both.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the function of the program modules may be combined or distributed as desired in various embodiments. In addition, the function may be embodied in whole or in part in firmware or hardware equivalents such as integrated circuits, field programmable gate arrays (FPGA), and the like.

References in the present disclosure to "one embodiment", "an embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It should be understood that, although the terms "first", "second" and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

The invention claimed is:

1. A method performed by a wireless device for performing one or more measurements of a neighbor cell during radio link monitoring, RLM, before or during Radio Link Failure (RLF), the method comprising:
   detecting a radio link problem, RLP, on a serving cell operating in a first carrier frequency;
   responsive to detecting the RLP, determining a frequency relationship between the first carrier frequency and a second carrier frequency for performing the one or more measurements on the neighbor cell, wherein the frequency relationship indicates that the first carrier frequency is different from the second carrier frequency, or the second carrier frequency is inter-frequency carrier; and
   determining, one or more measurement occasions for performing the one or more measurements on the neighbor cell, wherein the one or more measurement occasions comprise inactive time resources for the wireless device in the serving cell.

2. The method of claim 1 further comprising the step of using the one or more measurements to perform one or more of: performing Radio Resource Control, RRC, connection re-establishment on the neighbor cell; and acquiring system information of the neighbor cell.

3. The method of claim 1 wherein detecting the radio link problem comprises one of:
   a. detecting a predetermined number of consecutive out of sync indications;
   b. detecting a predetermined number of out of sync indications in a certain time period;
   c. detecting an RLF timer exceeding a predetermined threshold time;
   d. triggering an early Qout event when a signal quality is slightly higher than that corresponding to out-of-sync triggering threshold;
   e. detecting a serving cell quality metric falling below a predetermined threshold value;
   f. detecting a serving cell quality metric falling below a predetermined threshold value for a predetermined time;
   g. detecting a serving cell quality metric falling below a predetermined threshold value for a certain ratio or percentage of time over a time period;
   h. detecting a predetermined drop in a serving cell quality metric compared to a strongest serving cell quality; and
   i. detecting that the wireless device is not able to successfully receive a control channel from the serving cell.

4. The method of claim 1, wherein the one or more measurement occasions comprise time resources during DRX inactive time periods.

5. The method of claim 1, wherein the one or more measurement occasions comprise time resources during DRX inactive time periods provided that the DRX cycle is longer than predetermined threshold.

6. The method of claim 1, wherein the one or more measurement occasions comprise unused time resources during which the wireless device switches between uplink and downlink time resources of the serving cell during Half Duplex Frequency Division Duplex (HD-FDD) operation.

7. The method of claim 1, wherein the one or more measurement occasions comprise time resources occurring between control channel search spaces.

8. The method of claim 1, wherein the one or more measurement occasions comprise time resources during uplink transmission gaps for downlink synchronization.

9. The method of claim 1, wherein the one or more measurement occasions comprise subframes indicated as unavailable in a downlink bitmap configuration for use with the serving cell.

10. The method of claim 1, wherein the one or more measurement occasions comprise time resources during a downlink gap, wherein the downlink gap is used to mitigate downlink resource blocking caused by the wireless device being in poor coverage.

11. The method of claim 1 wherein, responsive to the first carrier frequency being an anchor carrier, the one or more measurement occasions are determined such that they do not overlap with anchor specific signals.

12. The method of claim 1 further comprising, responsive to detecting, determining a second carrier frequency for performing the one or more measurements on the neighbor cell.

13. The method of claim 1 further comprising performing the one or more measurements on the neighbor cell on the second carrier frequency during the one or more measurement occasions.

14. The method of claim 1 further comprising performing the one or more measurements responsive to the inactive time resources being sufficient to perform the one or more measurements during a measurement period.

15. The method of claim 1 further comprising performing the one or more measurements provided that interruption probabilities of downlink and uplink signals in the serving cell during a measurement period do not exceed predetermined thresholds.

16. A wireless device comprising:
   at least one processor; and
   at least one memory, the at least one memory containing instructions executable by the at least one processor, whereby the wireless device is operative to:
      detect a radio link problem, RLP, on a serving cell operating in a first carrier frequency;
      responsive to detecting the RLP, determine a frequency relationship between the first carrier frequency and a second carrier frequency for performing the one or more measurements on the neighbor cell, wherein the frequency relationship indicates that the first carrier frequency is different from the second carrier frequency, or the second carrier frequency is inter-frequency carrier; and
      determine one or more measurement occasions for performing the one or more measurements on the neighbor cell, wherein the one or more measurement occasions comprise inactive time resources for the wireless device in the serving cell.

17. A non-transitory computer readable storage medium comprising instructions which when executed by at least one processor, cause the at least one processor of a wireless device for performing one or more measurements of a neighbor cell during radio link monitoring, RLM, before or during Radio Link Failure (RLF) to:
   detect a radio link problem, RLP, on a serving cell operating in a first carrier frequency; responsive to detecting the RLP, determine a frequency relationship between the first carrier frequency and a second carrier frequency for performing the one or more measurements on the neighbor cell, wherein the frequency relationship indicates that the first carrier frequency is different from the second carrier frequency, or the second carrier frequency is inter-frequency carrier; and
determine one or more measurement occasions for performing the one or more measurements on the neighbor cell, wherein the one or more measurement occasions comprise inactive time resources for the wireless device in the serving cell.

\* \* \* \* \*